US011491507B2

(12) United States Patent
Okamoto et al.

(10) Patent No.: US 11,491,507 B2
(45) Date of Patent: Nov. 8, 2022

(54) SEALANT DISCHARGE NOZZLE AND SEALANT DISCHARGE APPARATUS (71) Applicant: THE UNIVERSITY OF TOKYO, Tokyo (JP)

(72) Inventors: Masayoshi Okamoto, Tokyo (JP); Tadamichi Mawatari, Tokyo (JP); Kensuke Tsuchiya, Tokyo (JP); Masayoshi Zaitsu, Kobe (JP); Naohiro Otsuki, Kobe (JP); Junji Tsuchiya, Tokyo (JP); Youhei Matsumoto, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 238 days.

(21) Appl. No.: 16/906,623

(22) Filed: Jun. 19, 2020

(65) Prior Publication Data
US 2020/0406289 A1 Dec. 31, 2020

(30) Foreign Application Priority Data

Jun. 26, 2019 (JP) .............................. JP2019-118190

(51) Int. Cl.
*B05C 5/02* (2006.01)
*B05C 17/005* (2006.01)
(Continued)

(52) U.S. Cl.
CPC ...... *B05C 17/00516* (2013.01); *B05C 5/0241* (2013.01); *B05C 5/0254* (2013.01);
(Continued)

(58) Field of Classification Search
CPC ............ B05C 5/02–022; B05C 5/0241; B05C 5/0254; B05C 5/0283; B05D 1/26; B05B 1/02; B05B 1/042; C09D 175/04
(Continued)

(56) References Cited

U.S. PATENT DOCUMENTS

| 796,246 | A | * | 8/1905 | Printz | .................. E04F 21/165 |
| | | | | | 279/93 |
| 4,074,655 | A | * | 2/1978 | Gross | ................ B05C 17/00516 |
| | | | | | 118/410 |

(Continued)

FOREIGN PATENT DOCUMENTS

| DE | 20 2014 001 032 U1 | 2/2014 |
| JP | 2006-167676 A | 6/2006 |
| JP | 5922539 B2 | 5/2016 |

*Primary Examiner* — David J Walczak
*Assistant Examiner* — Randall A Gruby
(74) *Attorney, Agent, or Firm* — Oliff PLC (57) ABSTRACT An object is to suppress a variation in amount of a sealant that is applied on an object to be sealed. There is provided a sealant discharge nozzle configured such that a sealant from a cartridge is discharged from a discharge hole of the sealant discharge nozzle. The sealant discharge nozzle has a leading end portion comprising a pair of side wall portions; and a connecting wall portion configured to connect the pair of side wall portions with each other and provided in cooperation with the pair of side wall portions to form a first recess that is open on one side in a first direction perpendicular to an axial direction of the sealant discharge nozzle, and on a leading end side. The discharge hole has an opening formed on a first recess side of the connecting wall portion.

10 Claims, 8 Drawing Sheets (51) Int. Cl.
B05D 1/26 (2006.01)
C09D 175/04 (2006.01)

(52) U.S. Cl.
CPC ...... B05C 5/0283 (2013.01); B05C 17/00569 (2013.01); B05C 17/00576 (2013.01); B05D 1/26 (2013.01); C09D 175/04 (2013.01)

(58) Field of Classification Search
USPC ................................ 401/193, 261, 263, 266
See application file for complete search history.

(56) References Cited

U.S. PATENT DOCUMENTS

| | | | | |
|---|---|---|---|---|
| 4,570,834 A | * | 2/1986 | Ward | B05C 21/00 401/266 |
| 5,480,487 A | * | 1/1996 | Figini | B01D 19/0036 96/194 |
| 6,117,490 A | * | 9/2000 | Nishida | B05C 5/0254 118/232 |
| 6,942,736 B2 | * | 9/2005 | Chinander | B05C 17/0103 118/692 |
| 6,986,472 B2 | * | 1/2006 | Gordon | B05C 17/00516 239/602 |
| 8,828,495 B2 | * | 9/2014 | Ogonowski | C08G 18/4883 427/427.4 |
| 9,592,516 B2 | * | 3/2017 | Wishneski | B29B 7/7447 |
| 9,598,605 B2 | * | 3/2017 | Ogonowski | B05B 7/0075 |
| 9,718,088 B2 | | 8/2017 | Nawata et al. | |
| 11,027,307 B2 | * | 6/2021 | Domenighi | B05C 17/00516 |
| 2007/0007370 A1 | * | 1/2007 | Roman | B05B 1/042 239/599 |
| 2016/0271629 A1 | | 9/2016 | Pringle, IV et al. | |
| 2018/0015494 A1 | | 1/2018 | Domenighi et al. | |
| 2019/0344293 A1 | * | 11/2019 | Knott | B05B 12/004 |
| 2020/0197974 A1 | * | 6/2020 | Otsuki | B05C 11/1002 |
| 2022/0080433 A1 | * | 3/2022 | Burkart | B05B 1/02 |

\* cited by examiner

SEALANT DISCHARGE NOZZLE AND SEALANT DISCHARGE APPARATUS

CROSS-REFERENCE TO RELATED APPLICATION

This application claims priority to Japanese Patent Application No. 2019-118190 filed on Jun. 26, 2019, the contents of which is incorporated herein by reference.

TECHNICAL FIELD

The present disclosure relates to a sealant discharge nozzle and a sealant discharge apparatus.

BACKGROUND

A proposed configuration of a sealant discharge nozzle employed for an object that has a stepped sectional shape in a first plane and that is extended along a first direction perpendicular to the first plane includes a forming module configured to form a sealant and a guide module provided adjacent to the forming module in the first direction (as described in, for example, Japanese Patent No. 5922539). In this sealant discharge nozzle, the forming module includes a forming surface provided in a specified shape in the first plane and extended along the first direction and a sealant supply hole provided in a space defined by the forming surface and the object to supply the sealant. The guide module includes a guide surface provided in a specified shape in the first plane, extended along the first direction, and formed to be in line contact with a corner of an upper step in the stepped shape. The sealant is formed on the object, while the sealant discharge nozzle is moved such that the guide module comes prior to the forming module along the first direction (the extending direction of the object). This suppresses a variation in shape of the sealant formed on the object.

CITATION LIST

Patent Literature

PTL 1: U.S. Pat. No. 5,922,539

SUMMARY

In the sealant discharge nozzle described above, the forming module has the forming surface provided in the specified shape in the first plane and extended along the first direction but is open on an opposite side to the guide module (i.e., a rear end side in a moving direction of the sealant discharge nozzle). In the case of a variation in discharge flow rate of the sealant discharged from the sealant supply hole, this configuration may fail to sufficiently suppress the variation in shape of the sealant formed on the object due to the effect of the varying discharge flow rate.

A main object of a sealant discharge nozzle and a sealant discharge apparatus according to the present disclosure is to suppress a variation in amount of a sealant that is applied on an object to be sealed.

In order to achieve the main object described above, a sealant discharge nozzle of the present disclosure is implemented by aspects described below.

The present disclosure is directed to a sealant discharge nozzle. The sealant discharge nozzle configured such that a sealant from a cartridge is discharged from a discharge hole of the sealant discharge nozzle, the sealant discharge nozzle has a leading end portion that includes a pair of side wall portions, and a connecting wall portion configured to connect the pair of side wall portions with each other and provided in cooperation with the pair of side wall portions to forma first recess that is open on one side in a first direction perpendicular to an axial direction of the sealant discharge nozzle, and on a leading end side. And the discharge hole has an opening formed on a first recess side of the connecting wall portion.

The sealant discharge nozzle according to this aspect of the present disclosure has the leading end portion including the pair of side wall portions; and the connecting wall portion configured to connect the pair of side wall portions with each other and provided in cooperation with the pair of side wall portions to form the first recess that is open on the one side in the first direction perpendicular to the axial direction of the sealant discharge nozzle, and on the leading end side. The discharge hole has the opening formed on the first recess side of the connecting wall portion. The first recess serves as a fluid reservoir that enables the sealant discharged from the opening of the discharge hole to be temporarily accumulated in the process of sealing an object to be sealed (sealing object) with moving the sealant discharge nozzle toward the one side in the first direction. Even in the case of a variation in discharge flow rate of the sealant discharged from the opening of the discharge hole, this configuration enables such a variation to be absorbed by the first recess. As a result, this configuration suppresses a variation in amount of the sealant applied on the sealing object, i.e., a variation in the shape (width, thickness and the like) of the sealant.

In the sealant discharge nozzle of the present disclosure, the leading end portion may include a leading end face formed to be protruded to the leading end side with gradually increasing a degree of protrusion from respective sides to a center of the leading end face when being viewed in the first direction. In this case, in the sealant discharge nozzle described above, the leading end face may be formed to at least partly include a curved portion in a curved shape when being viewed in the first direction. In this case, in the sealant discharge nozzle described above, the curved portion may be at least one of an arc portion in an arc shape, an elliptical arc portion in an elliptical arc shape, or a spline curve portion in a spline curved shape. This configuration provides a concave surface geometry of the sealant applied on sealing object (i.e., a shape concaved toward the sealing object side) in the process of sealing the sealing object with moving the sealant discharge nozzle toward the one side in the first direction along an extending direction of a boundary portion between two members.

In the sealant discharge nozzle of the present disclosure, the connecting wall portion may have a first surface on the first recess side formed to be inclined to the one side in the first direction along a direction from the leading end side to a base end side. This configuration enables the sealant discharged from the discharge hole to be pressed against the sealing object by the first surface of the connecting wall portion in the process of sealing the sealing object with moving the sealant discharge nozzle toward the one side in the first direction.

In the sealant discharge nozzle of the present disclosure, the connecting wall portion may be provided in cooperation with the pair of side wall portions to form a second recess that is open on the other side that is different from the one side in the first direction, and on the leading end side. This configuration allows for shaping of the sealant applied on the sealing object (including collection of the excessive sealant by the second recess), while moving the sealant discharge nozzle toward the other side in the first direction. In this case, the connecting wall portion may have a second surface on the second recess side formed to be inclined to the other side in the first direction along a direction from the leading end side to a base end side.

In the sealant discharge nozzle of the present disclosure, the opening of the discharge hole may be formed to have a length in the first direction that is longer than a length in a second direction perpendicular to the axial direction and the first direction. This configuration brings the opening close to the leading end side of the sealant discharge nozzle, while ensuring the opening area of the opening of the discharge hole. This configuration suppresses the sealant from overflowing from the one side in the first direction of the pair of side wall portions and adhering to any part other than the sealing object.

In the sealant discharge nozzle of the present disclosure, the opening of the discharge hole may be configured such that at least part of the opening is protruded to the leading end side more than the pair of side wall portions. This configuration suppresses the sealant from overflowing from the one side in the first direction of the pair of side wall portions and adhering to any part other than the sealing object.

In the sealant discharge nozzle of the present disclosure, the sealant discharge nozzle may include a leading end-side member on the leading end side and a base end-side member on a base end side that are connected with each other by a deforming portion configured to be deformable. This configuration enables the leading end portion of the sealant discharge nozzle to be appropriately pressed against the vicinity of the sealing object.

In the sealant discharge nozzle of the present disclosure, the sealant discharge nozzle may include a middle portion in the axial direction that has a larger inner diameter than an inner diameter of a base end portion. This configuration reduces a pressure loss in the sealant discharge nozzle. As a result, this provides good suck-back (good response of the sealant at the time of terminating the discharge of the sealant from the discharge hole).

According to another aspect of the present disclosure, there is provided a sealant discharge apparatus including the sealant discharge nozzle according to any of the aspects of the present disclosure described above, a cartridge configured such that the sealant discharge nozzle is mounted to a leading end portion of the cartridge, a plunger configured to seal a sealant in the cartridge and to be movable in an axial direction of the cartridge, and a piston configured to press the plunger against a leading end side of the cartridge.

The sealant discharge apparatus according to this aspect of the present disclosure includes the sealant discharge nozzle according to any of the aspects of the present disclosure described above. Accordingly, the sealant discharge apparatus has advantageous effects similar to those of the sealant discharge nozzle described above, for example, an advantageous effect of suppressing a variation in amount of the sealant applied on the sealing object, i.e., a variation in the shape (width, thickness and the like) of the sealant.

DESCRIPTION OF EMBODIMENTS

The following describes aspects of the present disclosure with reference to an embodiment.

Figure 1:
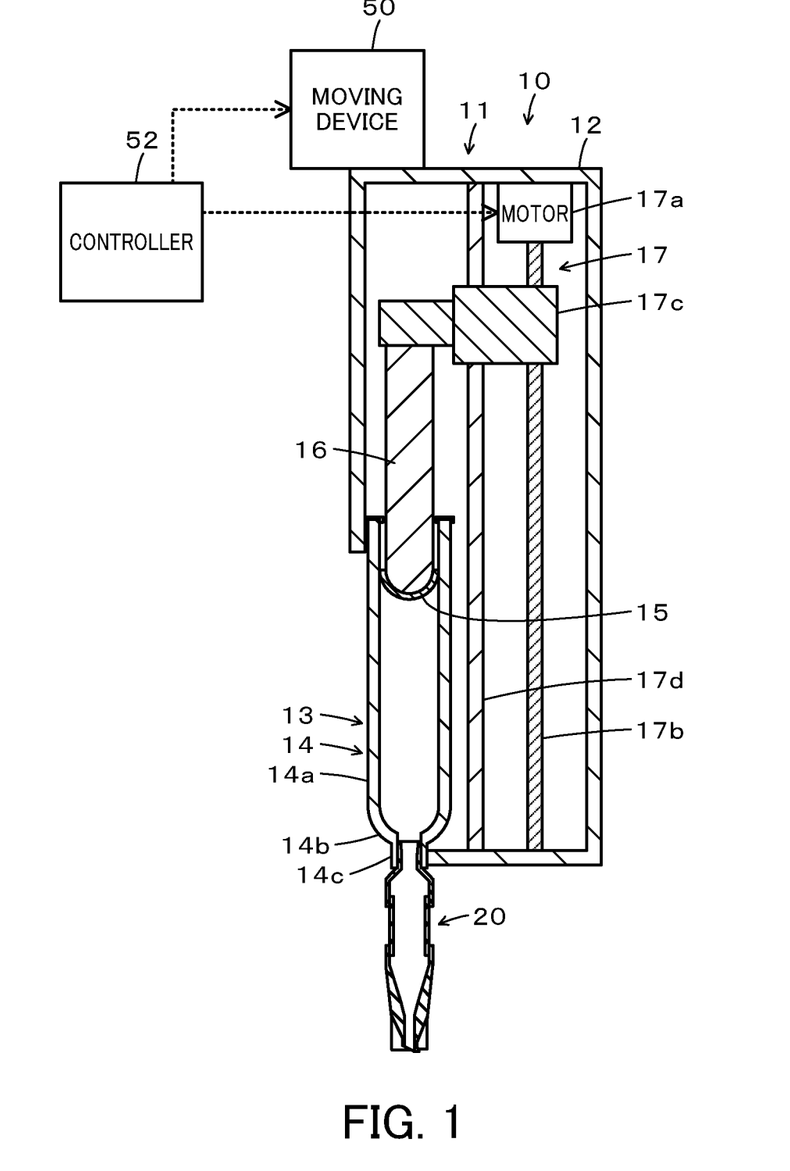
FIG. 1 is a configuration diagram illustrating the schematic configuration of a sealant discharge system provided with a nozzle (sealant discharge nozzle) according to one embodiment of the present disclosure.

FIG. 1 is a configuration diagram illustrating the schematic configuration of a sealant discharge system 10 provided with a nozzle (sealant discharge nozzle) 20 according to one embodiment of the present disclosure. The sealant discharge system 10 is used to seal an object to be sealed (sealing object) in the aircraft industry or the like. As illustrated, the sealant discharge system 10 includes a sealant discharge apparatus 11, a moving device 50 configured to move the sealant discharge apparatus 11 and a controller 52 configured to control the entire system. The sealing object in the aircraft industry or the like is, for example, a boundary portion between an aircraft body and a window frame.

The sealant discharge apparatus 11 includes a cartridge with plunger 13 configured such that a cartridge 14 filled with a sealant (sealing material) is sealed by a plunger 15; the nozzle 20 mounted to the cartridge 14; a piston 16 configured to press the plunger 15 toward a leading end of the cartridge 14; and a piston driving module 17 configured to move the piston 16 in an axial direction of the cartridge 14. The following first describes the configuration of the sealant discharge apparatus 11 other than the nozzle 20, the moving device 50 and the controller 52, and then describes the nozzle 20.

The cartridge with plunger 13 used is, for example, a commercially available product. The sealant used is, for example, a silicone resin, an epoxy resin or polyurethane. The cartridge 14 is made of, for example, polypropylene, polyethylene or nylon, is formed in a bottomed approximately cylindrical shape that is open on one end, and is fixed to a base member 12. This cartridge 14 includes a tubular portion 14a that is formed in a cylindrical shape, a hemispherical portion 14b that is extended in a hemispherical shape from an end of the tubular portion 14a to be convex on a side farther from the tubular portion 14a and that has a hole on a center thereof, and a leading end portion 14c that is formed in a cylindrical shape and that is extended from a periphery of the hole of the hemispherical portion 14b to an opposite side to the tubular portion 14a. The plunger 15 is made of, for example, an ABS resin to be formed in a hemispherical shape. This plunger 15 is placed in the cartridge 14 such that a convex side thereof is a leading end portion 14c-side of the cartridge 14 and is configured to seal the sealant in the cartridge 14.

The piston 16 is made of, for example, an aluminum alloy to be formed in a columnar shape and has a hemispherical leading end portion that fits the shape of the plunger 15. This piston 16 is placed such that a leading end side thereof is a plunger 15-side. The piston driving module 17 includes a motor 17a driven with electric power from a non-illustrated AC power source (for example, industrial power source), a ball screw 17b connected with a rotating shaft of the motor 17a, a slider 17c screwed to the ball screw 17b and fixed to the piston 16, and a guide rail 17d configured to guide the moves of the piston 16 and the slider 17c along the axial direction of the cartridge 14. The motor 17a and the guide rail 17d are fixed to the base member 12. The ball screw 17b is supported to be rotatable by the base member 12.

The moving device 50 is configured, for example, as a robot arm to move the base member 12 and thereby move the entire sealant discharge apparatus 11. The controller 52 is configured by a computer including, for example, a CPU, a ROM, a RAM and input/output ports. Signals from a non-illustrated input device that is operated by an operator to give various instructions, as well as signals from various sensors are input into the controller 52 via the input port. The signals from the various sensors include, for example, a signal from a rotational position sensor configured to detect the rotational position of a rotor of the motor 17a and a signal from a current sensor configured to detect the electric current flowing in the motor 17a. For example, control signals to the motor 17a are output from the controller 52 via the output port.

Figure 2:
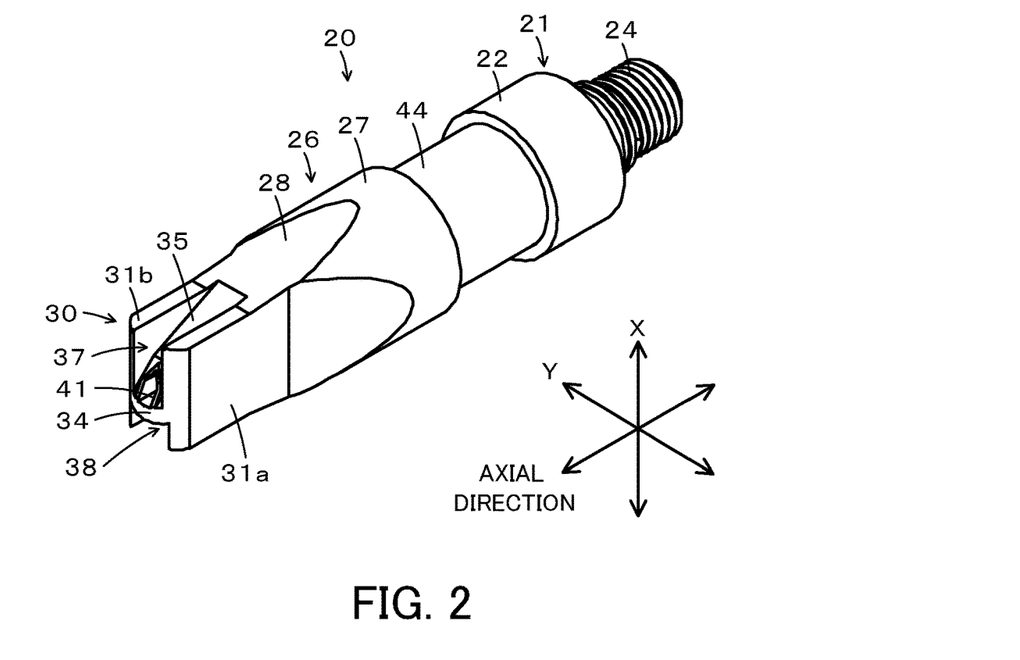
FIG. 2 is a perspective view illustrating the nozzle of the embodiment.
Figure 3:
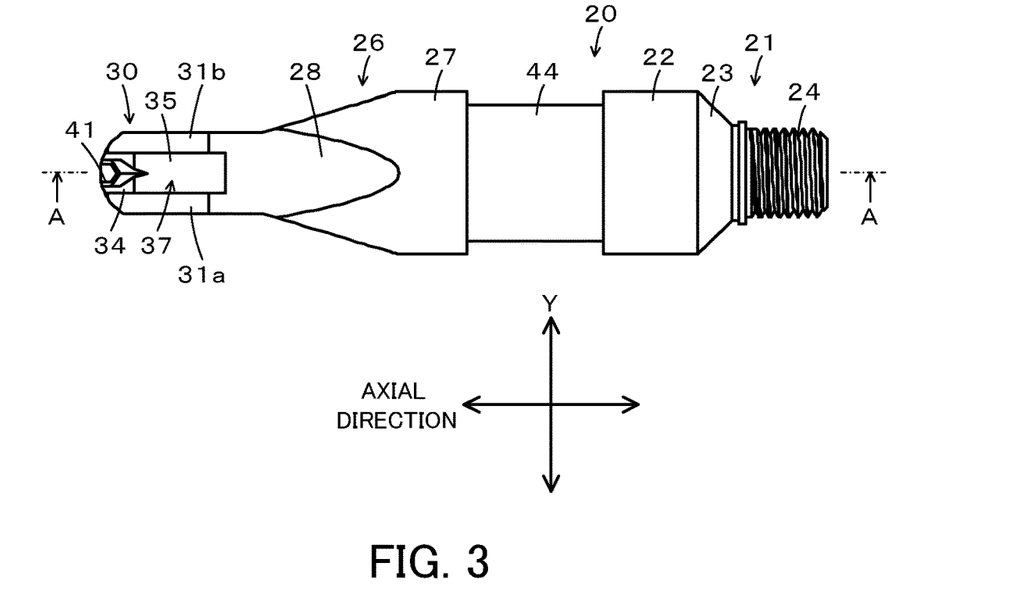
FIG. 3 is a top view illustrating the nozzle of FIG. 2 viewed from a top side.
Figure 4:
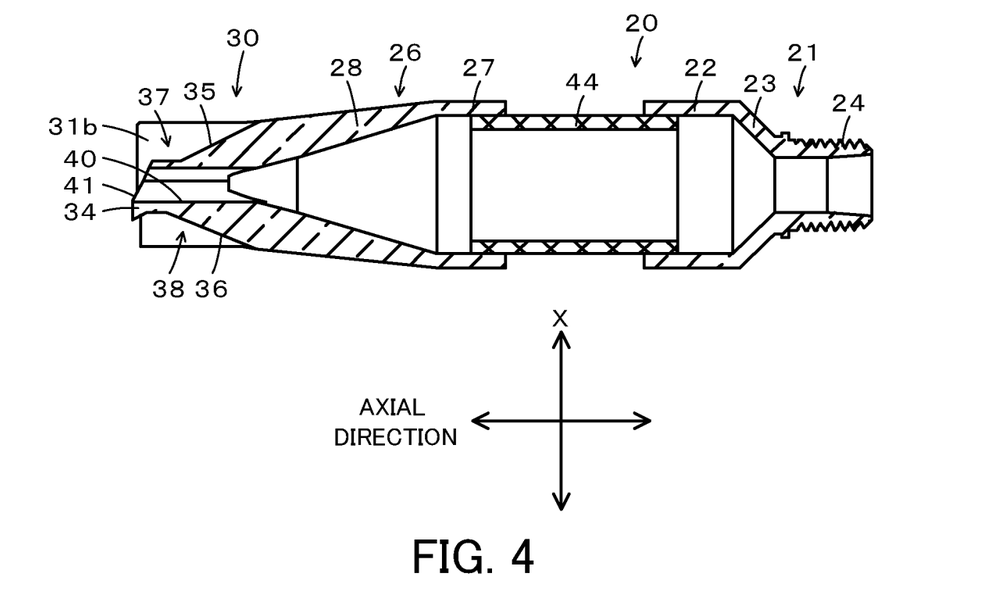
FIG. 4 is a sectional view illustrating the nozzle taken along an A-A line in FIG. 3.
Figure 5:
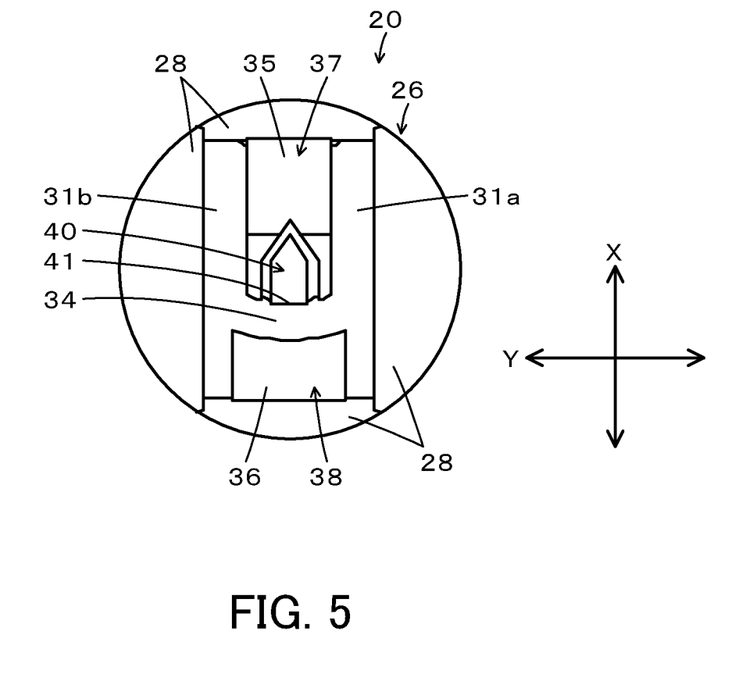
FIG. 5 is a front view illustrating the nozzle of FIG. 2 viewed in an axial direction of the nozzle from a leading end side thereof.

The following describes the nozzle 20 in detail. FIG. 2 is a perspective view illustrating the nozzle 20. FIG. 3 is a top view illustrating the nozzle 20 of FIG. 2 viewed from the top side. FIG. 4 is a sectional view illustrating the nozzle 20 taken along an A-A line in FIG. 3. FIG. 5 is a front view illustrating the nozzle 20 of FIG. 2 viewed in an axial direction of the nozzle 20 from a leading end side thereof. In the following description of the nozzle 20, among directions perpendicular to the axial direction of the nozzle 20, vertical directions of FIG. 2, FIG. 4 and FIG. 5 may be referred to as "X direction" (first direction). A direction from a right front side to a left back side of FIG. 2, a vertical direction of FIG. 3, and a horizontal direction of FIG. 5 may be referred to as "Y direction" (second direction). The X direction and the Y direction are perpendicular to each other. With regard to the X direction, upper sides of FIG. 2, FIG. 4 and FIG. 5 may be called "one side", and lower sides thereof may be called "the other side".

The nozzle 20 is formed in an approximately cylindrical shape as a whole and includes abase end-side member 21 formed on a base end side (i.e., on a cartridge 14-side), a leading end-side member 26 formed on a leading end side (i.e., on an opposite side to the cartridge 14) to have a discharge hole 40, and a linkage member 44 configured to link the base end-side member 21 with the leading end-side member 26. The sealant from the cartridge 14 is flowed inside of the nozzle 20 (more specifically, inside of the base end-side member 21, inside of the linkage member 44, and inside of the leading end-side member 26) and is discharged from the discharge hole 40.

The base end-side member 21 is made of, for example, an ABS resin and includes a large diameter tubular portion 22 that is formed in a cylindrical shape, a tapered tubular portion 23 that is formed in a tapered cylindrical shape and that is extended from one end of the large diameter tubular portion 22, and a small diameter tubular portion 24 that is formed in a cylindrical shape and that is extended from one end of the tapered tubular portion 23 on the opposite side to the large diameter tubular portion 22.

The large diameter tubular portion 22 has a relatively large inner diameter and a relatively large outer diameter or more specifically, has an inner diameter and an outer diameter that are sufficiently larger than those of the small diameter tubular portion 24. The tapered tubular portion 23 is configured such that an inner circumferential face and an outer circumferential face of the tapered tubular portion 23 become closer to an axial center of the nozzle 20 along a direction from the large diameter tubular portion 22-side to the small diameter tubular portion 24-side at any position in a circumferential direction (i.e., along the entire circumference of the tapered tubular portion 23). The small diameter tubular portion 24 has a helical groove formed in an outer circumferential face thereof. This groove of the small diameter tubular portion 24 is screwed to a groove formed in an inner circumferential face of the leading end portion 14c of the cartridge 14, so that the nozzle 20 is mounted to the cartridge 14.

The leading end-side member 26 is made of, for example, an ABS resin and includes a large diameter tubular portion 27 that is formed in a cylindrical shape, a tapered tubular portion 28 that is formed in a tapered approximately cylindrical shape and that is extended from one end of the large diameter tubular portion 27, and a leading end portion 30 that is extended from one end of the tapered tubular portion 28 on the opposite side to the large diameter tubular portion 27 and that has the discharge hole 40.

The large diameter tubular portion 27 has an inner diameter and an outer diameter that are identical with those of the large diameter tubular portion 22. The tapered tubular portion 28 is configured such that an inner circumferential face of the tapered tubular portion 28 becomes closer to the axial center of the nozzle 20 along a direction from the large diameter tubular portion 27-side to the leading end portion 30-side at any position in a circumferential direction and also becomes closer to the axial center of the nozzle 20 in a planar shape at intervals in the circumferential direction (on both sides in the X direction and in the Y direction). According to a modification, the tapered tubular portion 28 may be configured such that an inner circumferential face and an outer circumferential face of the tapered tubular portion 28 become closer to the axial center of the nozzle 20 along the direction from the large diameter tubular portion 27-side to the leading end portion 30-side at any position in the circumferential direction (i.e., along the entire circumference of the tapered tubular portion 28).

The leading end portion 30 includes a pair of side wall portions 31a and 31b and a connecting wall portion 34 provided to connect the pair of side wall portions 31a and 31b with each other, in addition to the discharge hole 40. The leading end portion 30 has a leading end face formed in an arc shape (R shape) to be protruded to the leading end side of the nozzle 20 with gradually increasing the degree of protrusion from respective sides to a center of the leading end face when being viewed in the X direction (as shown in FIG. 3).

The pair of side wall portions 31a and 31b are formed to be respectively extended along the axial direction of the nozzle 20 and the X direction and to be opposed to each other across an interval. The connecting wall portion 34 is in cooperation with the pair of side wall portions 31a and 31b to forma first recess 37 that is open on one side in the X direction (the upper side in FIG. 4) and the leading end side and to form a second recess 38 that is open on the other side in the X direction (the lower side in FIG. 4) and the leading end side. The nozzle 20 has a leading end face formed in an approximately H shape when being viewed in the axial direction (as shown in FIG. 5).

A first surface 35 of the connecting wall portion 34 on one side in the X direction (i.e., the first recess 37-side) is formed to be inclined to one side in the X direction along a direction from the leading end side to the base end side of the nozzle 20. A second surface 36 of the connecting wall portion 34 on the other side in the X direction (i.e., the second recess 38-side) is formed to be inclined to the other side in the X direction along the direction from the leading end side to the base end side of the nozzle 20. Accordingly, the first recess 37 and the second recess 38 respectively have depths in the X direction that become shallower along the direction from the leading end side to the base end side of the nozzle 20.

The discharge hole 40 is formed to pass through the connecting wall portion 34 in the axial direction of the nozzle 20 and has an opening 41 that is formed on the first recess 37-side of the connecting wall portion 34. Accordingly, the discharge hole 40 is arranged to connect inside of the nozzle 20 with outside of the nozzle 20 (including the first recess 37). This opening 41 is configured such that at least part of the opening 41 is protruded to the leading end side of the nozzle 20 more than the pair of side wall portions 31a and 31b. The opening 41 is also formed to have a length in the X direction that is longer than a length in the Y direction (as shown in FIG. 5).

The linkage member 44 is made of a material having the higher flexibility than the materials of the base end-side member 21 and the leading end-side member 26, for example, nylon or rubber, and is formed in a cylindrical shape. This linkage member 44 has an outer diameter that is approximately equal to the inner diameters of the large diameter tubular portions 22 and 27 and an inner diameter that is slightly smaller than the outer diameter and that is sufficiently larger than the inner diameter of the small diameter tubular portion 24. The linkage member 44 has one end portion that is inserted into the large diameter tubular portion 22 of the base end-side member 21 and is mounted to an opening end portion of the large diameter tubular portion 22, and the other end portion that is inserted into the large diameter tubular portion 27 of the leading end-side member 26 and is mounted to an opening end portion of the large diameter tubular portion 27.

Figure 6:
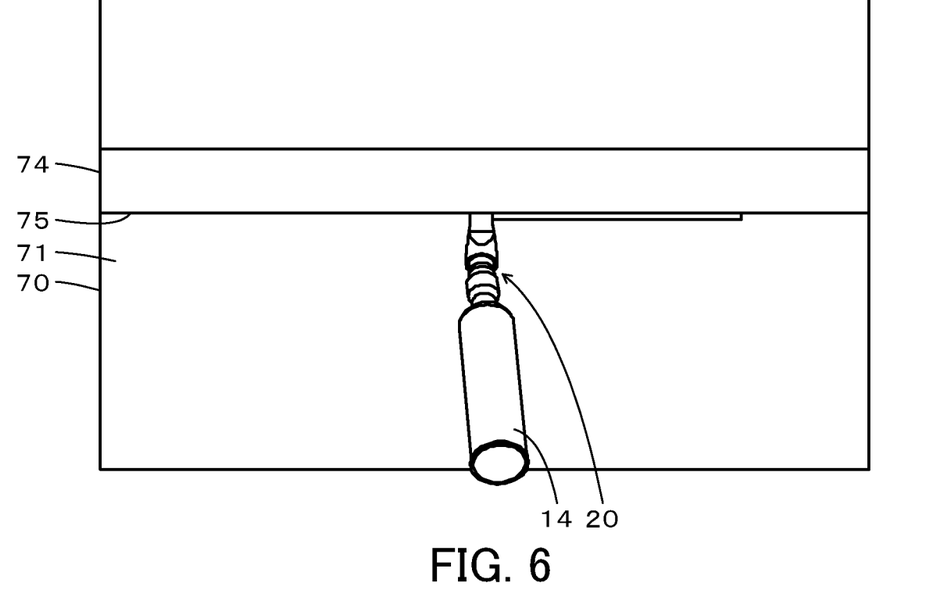
FIG. 6 is a diagram illustrating one exemplified state of a cartridge and the nozzle when a boundary portion between an upper face of a first member and a side face of a second member is specified as an object to be sealed and is sealed by the sealant discharge system.
Figure 7:
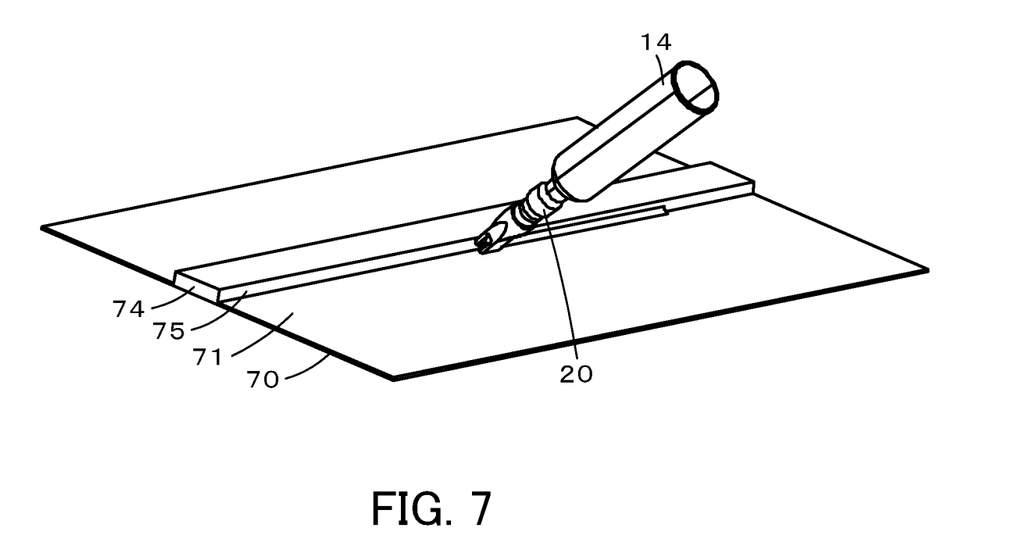
FIG. 7 is a diagram illustrating the exemplified state of the cartridge and the nozzle when the boundary portion between the upper face of the first member and the side face of the second member is specified as the object to be sealed and is sealed by the sealant discharge system.
Figure 8:
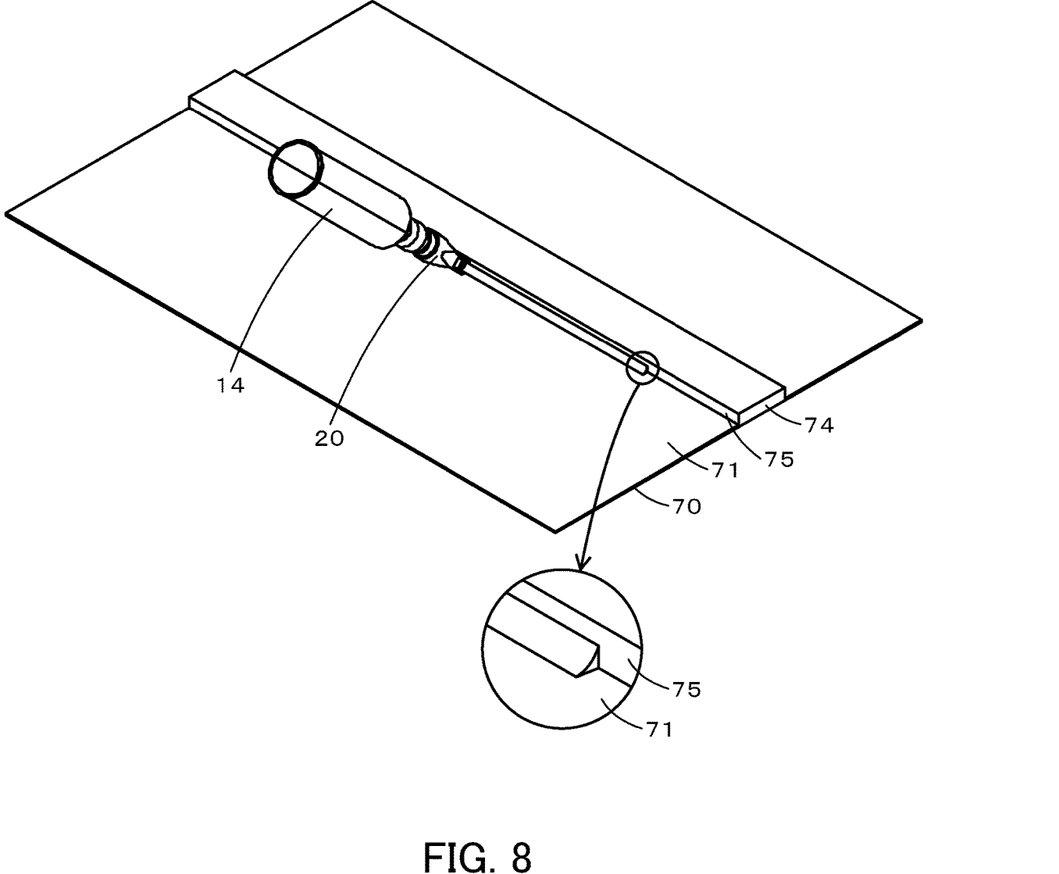
FIG. 8 is a diagram illustrating the exemplified state of the cartridge and the nozzle when the boundary portion between the upper face of the first member and the side face of the second member is specified as the object to be sealed and is sealed by the sealant discharge system.

The following describes operations of the sealant discharge system 10 having the configuration described above or more specifically describes a series of operations to seal an object to be sealed (sealing object) by the sealant discharge system 10. FIGS. 6 to 8 are diagrams illustrating one exemplified state of the cartridge 14 and the nozzle 20 when a boundary portion between an upper face 71 of a first member 70 and a side face 75 of a second member 74 is specified as an object to be sealed (sealing object) and is sealed by the sealant discharge system 10. The diagram of FIG. 7 corresponds to a view of FIG. 6 viewed from a lower left side. The diagram of FIG. 8 corresponds to a view of FIG. 6 viewed from a lower right side. The upper face 71 of the first member 70 and the side face 75 of the second member are perpendicular to each other (i.e., have an angle of 90 degrees when being viewed in the horizontal direction of FIG. 6). The first member 70 and the second member 74 are, for example, an aircraft body and a window frame.

In the process of sealing the sealing object by the sealant discharge system 10, the controller 52 first controls the moving device 50 to align the leading end portion 30 of the nozzle 20 with a starting position of the sealing object. In this state, one side of the nozzle 20 in the X direction (the first recess 37-side) and the other side of the nozzle 20 in the X direction (the second recess 38-side) are respectively a front side (an end position side of the sealing object, left side in FIG. 6) and a rear side in an extending direction of the sealing object (the horizontal direction of FIG. 6). The axial direction of the nozzle 20 is approximately 45 degrees to the upper face 71 of the first member 70 and to the side face 75 of the second member 74.

The controller 52 subsequently starts nozzle forward control that controls the moving device 50 to move the nozzle (the sealant discharge apparatus 11) along the extending direction of the sealing object to the end position side of the sealing object (left side in FIG. 6), while performing piston forward control that controls the motor 17a of the piston driving module 17 to move the piston 16 toward the leading end side of the cartridge 14. When the leading end portion 30 of the nozzle 20 reaches the end position of the sealing object, the controller 52 terminates the piston forward control to terminate the discharge of the sealant from the opening 41 of the discharge hole 40, terminates the nozzle forward control, and controls the moving device 50 to separate the nozzle 20 from the sealing object.

According to the embodiment, the leading end portion 30 of the nozzle 20 has the first recess 37. The first recess 37 of the nozzle 20 serves as a fluid reservoir that enables the sealant discharged from the opening 41 of the discharge hole 40 to be temporarily accumulated during execution of the piston forward control and the nozzle forward control. Even in the case of a variation in discharge flow rate of the sealant discharged from the opening 41 of the discharge hole 40, this configuration enables such a variation to be absorbed by the first recess 37. As a result, this configuration suppresses a variation in amount of the sealant applied on the sealing object, i.e., a variation in the shape (width, thickness and the like) of the sealant.

Furthermore, the leading end face of the leading end portion 30 of the nozzle 20 is formed in the arc shape (R shape) to be protruded to the leading end side of the nozzle 20 with gradually increasing the degree of protrusion from the respective sides to the center of the leading end face when being viewed in the X direction. This configuration provides a concave surface geometry of the sealant discharged onto the sealing object (more specifically, an R shape concaved toward the boundary portion between the upper face 71 of the first member 70 and the side face 75 of the second member 74 when being viewed in the extending direction of the sealing object) as shown by a partly enlarged view of FIG. 8, during execution of the piston forward control and the nozzle forward control.

Moreover, the first surface 35 on one side in the X direction (the first recess 37-side) of the connecting wall portion 34 of the leading end portion 30 of the nozzle 20 is formed to be inclined to one side in the X direction along the direction from the leading end side to the base end side of the nozzle 20. This configuration enables the sealant discharged from the opening 41 of the discharge hole 40 to be pressed against the sealing object by the first surface 35 during execution of the piston forward control and the nozzle forward control.

Additionally, the opening 41 of the discharge hole 40 of the nozzle 20 is formed to have the length in the X direction that is longer than the length in the Y direction. This configuration brings the opening 41 close to the leading end side of the nozzle 20, while ensuring the opening area of the opening 41 of the discharge hole 40. At least part of the opening 41 of the discharge hole 40 of the nozzle 20 is protruded to the leading end side of the nozzle 20 more than the pair of side wall portions 31a and 31b. This configuration suppresses the sealant from overflowing from one side in the X direction of the pair of side wall portions 31a and 31b and adhering to any part other than the sealing object during execution of the piston forward control and the nozzle forward control, compared with a configuration that the opening 41 of the discharge hole 40 is separate from the leading end face of the nozzle 20.

Furthermore, the nozzle 20 is configured such that the base end-side member 21 and the leading end-side member 26 are connected with each other by the linkage member 44 having the higher flexibility than the base end-side member 21 and the leading end-side member 26. This configuration enables the leading end portion 30 of the nozzle 20 to be more readily pressed against the vicinity of the boundary portion between the upper face 71 of the first member 70 and the side face 75 of the second member 74 during execution of the piston forward control and the nozzle forward control. As a result, this configuration enables the position of the leading end portion 30 of the nozzle 30 to be readily adjusted by the moving device 50.

Moreover, the nozzle 20 is formed to have the relatively large inner diameters of the large diameter tubular portions 22 and 27 and the relatively large inner diameter of the linkage member 44 (to be sufficiently larger than the inner diameter of the small diameter tubular portion 24). This configuration reduces a pressure loss of the sealant that flows inside of the large diameter tubular portions 22 and 27 and inside of the linkage member 44. The following describes a reason of such a reduction in the pressure loss in the case where a fluid flows inside of a cylindrical member as an example. A pressure loss ΔP of the fluid is expressed by Expression (1) given below by using a Reynolds number Re, a length l in an axial direction of the cylindrical member, an inner diameter d of the cylindrical member, a density ρ of the fluid, and an average flow rate u of the fluid. The Reynolds number Re is expressed by Expression (2) by using a viscosity μ of the fluid, the density ρ of the fluid, the average flow rate u of the fluid and the inner diameter d of the cylindrical member. Accordingly, the pressure loss ΔP of the fluid is inversely proportional to the square of the inner diameter d of the cylindrical member. The nozzle 20 is formed to have the relatively large inner diameters of the large diameter tubular portions 22 and 27 and the relatively large inner diameter of the linkage member 44. This configuration is thus expected to reduce the pressure loss of the sealant flowing inside of the large diameter tubular portions 22 and 27 and inside of the linkage member 44. Reduction in the pressure loss of the sealant flowing inside of the large diameter tubular portions 22 and 27 and inside of the linkage member 44 provides good suck-back (good response of the sealant at the time of terminating the discharge of the sealant from the opening 41 of the discharge hole 40).

[Math. 1]

$$\Delta P = \frac{64}{Re} \times \frac{l}{d} \times \frac{\rho \times u^2}{2} \quad (1)$$

$$Re = \frac{\rho \times u \times d}{\mu} \quad (2)$$

MATH. 1

It is preferable to appropriately interrupt the piston forward control and the nozzle forward control and perform nozzle reverse control that controls the moving device 50 to move the nozzle 20 (the sealant discharge apparatus 11) along the extending direction of the sealing object to the starting position side of the sealing object (right side in FIG. 6). The leading end portion 30 of the nozzle 20 has the second recess 38. Execution of the nozzle reverse control thus allows for shaping of the sealant discharged onto the sealing object (including collection of the excessive sealant by the second recess 38 of the nozzle 20).

As understood from FIGS. 2 to 4, the relatively short length in the X direction of the leading end portion 30 of the nozzle 20 enables the nozzle (the sealant discharge system 10) to appropriately apply the sealant onto not only the sealing object that is linearly extended (as shown in FIGS. 6 to 8) but the sealing object that is at least partly extended in a curved shape (for example, in an annular shape or in an elliptical annular shape). As described above, the opening 41 of the discharge hole 40 of the nozzle 20 is formed to have the length in the X direction that is longer than the length in the Y direction, and at least part of the opening 41 of the discharge hole 40 of the nozzle 20 is protruded to the leading end side of the nozzle 20 more than the pair of side wall portions 31a and 31b. This configuration brings the opening 41 close to the leading end side of the nozzle 20, while ensuring the opening area of the opening 41 of the discharge hole 40. This enables the sealant to be more appropriately applied onto the curved part.

In the nozzle 20 of the sealant discharge system 10 according to the embodiment described above, the leading end portion 30 includes the pair of side wall portions 31a and 31b, and the connecting wall portion 34 configured to connect the pair of side wall portions 31a and 31b with each other and provided in cooperation with the pair of side wall portions 31a and 31b to form the first recess 37 that is open on one side in the X direction perpendicular to the axial direction of the nozzle 20 and the leading end side of the nozzle 20. The opening 41 of the discharge hole 40 is formed on the first recess 37-side of the connecting wall portion 34. The first recess 37 accordingly serves as the fluid reservoir that enables the sealant discharged from the opening 41 of the discharge hole 40 to be temporarily accumulated in the process of sealing the sealing object with moving the nozzle 20 toward the one side in the X direction. Even in the case of a variation in discharge flow rate of the sealant discharged from the opening 41 of the discharge hole 40, this configuration enables such a variation to be absorbed by the first recess 37. As a result, this configuration suppresses a variation in amount of the sealant applied on the sealing object, i.e., a variation in the shape (width, thickness and the like) of the sealant.

In the nozzle 20 according to the embodiment, the leading end face of the leading end portion 30 is formed in the arc shape (R shape) to be protruded to the leading end side of the nozzle 20 with gradually increasing the degree of protrusion from the respective sides to the center of the leading end face when being viewed in the X direction. The shape of the leading end face is, however, not limited to this shape. For example, the leading end face may be formed in an elliptical arc shape or in a spline curved shape when being viewed in the X direction or may be formed in a combined shape of a linear straight portion with at least one of an arc portion in an arc shape, an elliptical arc portion in an elliptical arc shape, and a spline curve portion in a spline curved shape.

In the nozzle 20 according to the embodiment, the leading end face of the leading end portion 30 is configured to be protruded to the leading end side of the nozzle 20 with gradually increasing the degree of protrusion from the respective sides to the center of the leading end face when being viewed in the X direction. This configuration is, however, not essential.

In the nozzle 20 according to the embodiment described above, the opening 41 of the discharge hole 40 of the leading end portion 30 is formed to have the length in the X direction that is longer than the length in the Y direction. According to a modification, the opening 41 may be formed to have the length in the X direction that is approximately equal to the length in the Y direction or may be formed to have the length in the X direction that is shorter than the length in the Y direction.

Figure 9:
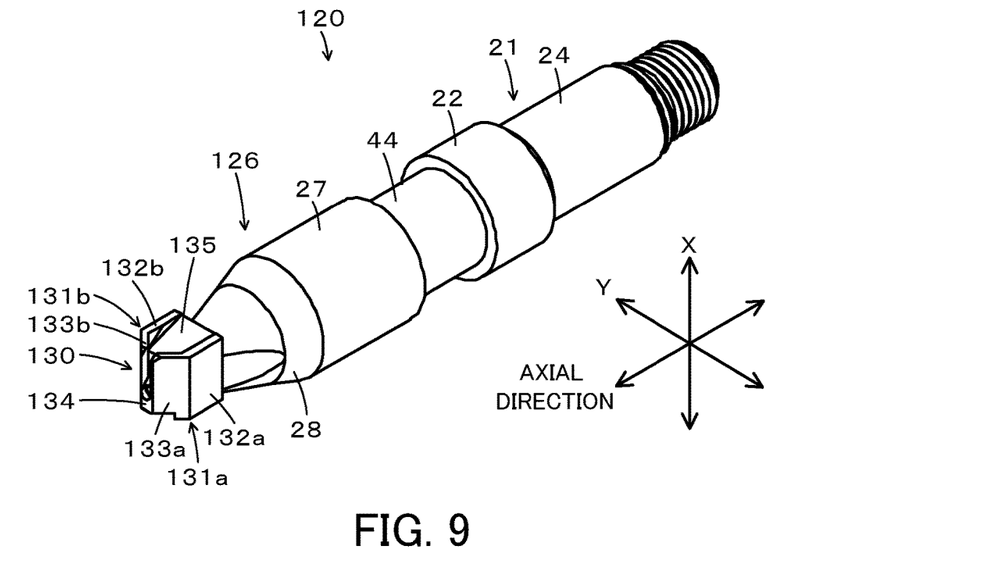
FIG. 9 is a perspective view illustrating a nozzle according to a modification.
Figure 10:
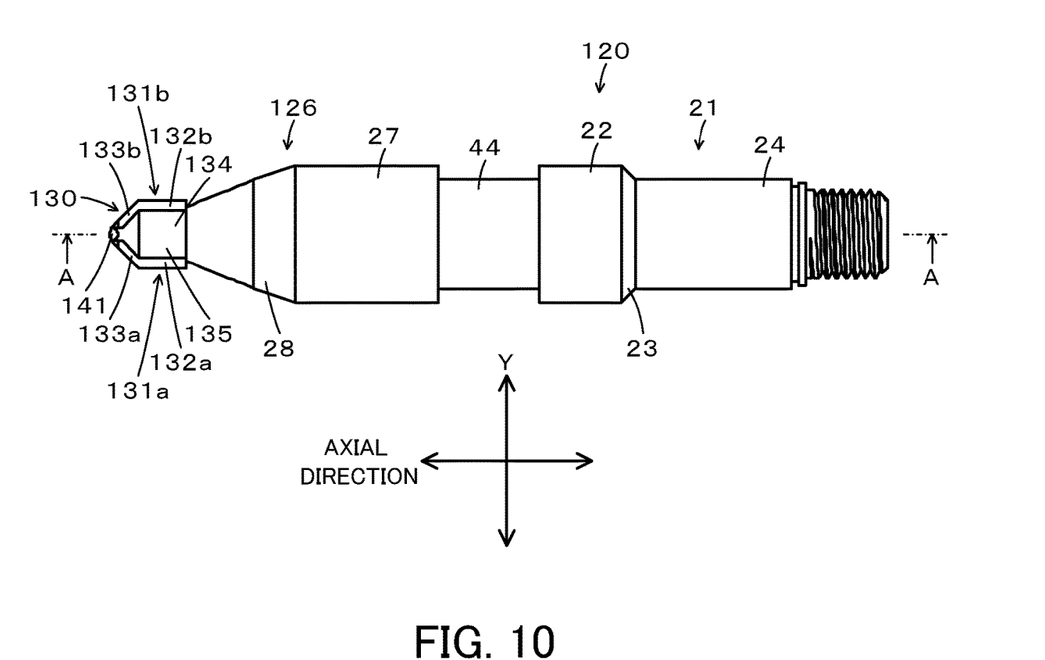
FIG. 10 is a top view illustrating the nozzle of FIG. 9 viewed from the top side.
Figure 11:
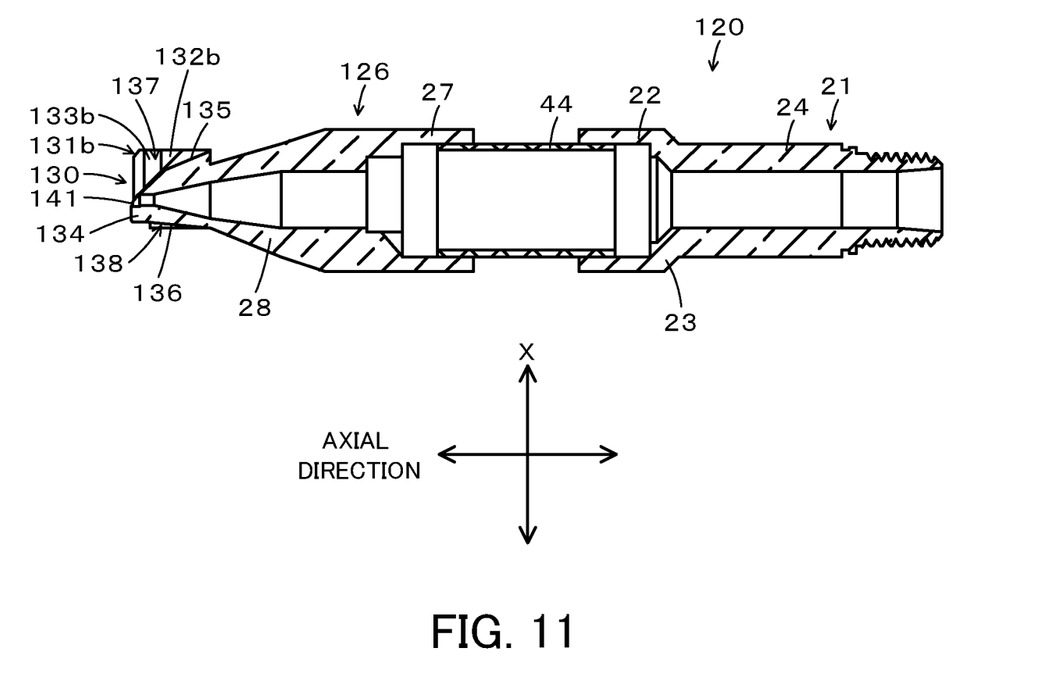
FIG. 11 is a sectional view illustrating the nozzle taken along an A-A line in FIG. 10.
Figure 12:
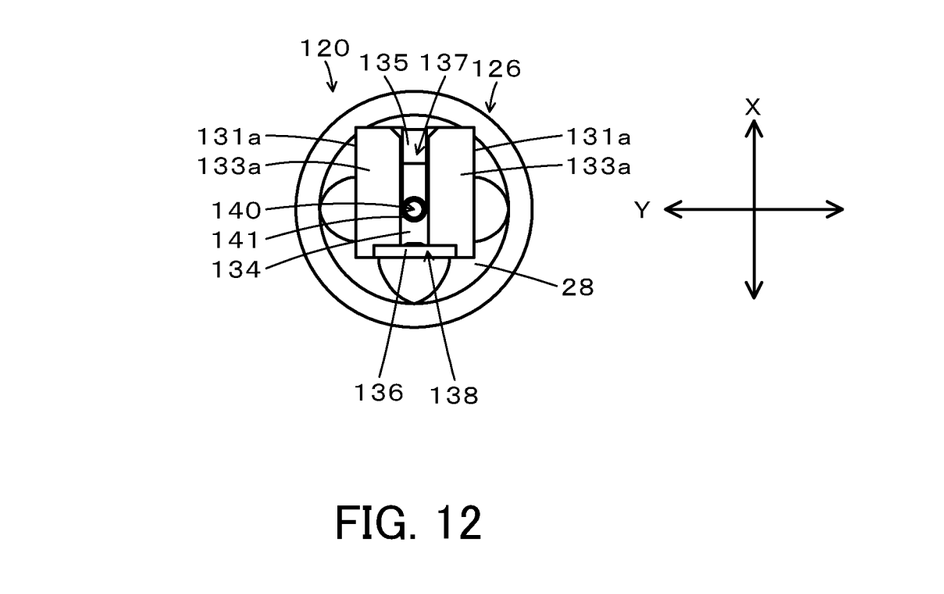
FIG. 12 is a front view illustrating the nozzle of FIG. 9 viewed in an axial direction of the nozzle from a leading end side thereof.

The sealant discharge system 10 according to the embodiment uses the nozzle 20 illustrated in FIGS. 2 to 5. According to a modification, the sealant discharge system 10 may use a nozzle 120 illustrated in FIGS. 9 to 12, in place of the nozzle 20. FIG. 9 is a perspective view illustrating the nozzle 120. FIG. 10 is a top view illustrating the nozzle 120 of FIG. 9 viewed from the top side. FIG. 11 is a sectional view illustrating the nozzle 120 taken along an A-A line in FIG. 10. FIG. 12 is a front view illustrating the nozzle 120 of FIG. 9 viewed in an axial direction of the nozzle 120 from a leading end side thereof. In the following description of the nozzle 120, among directions perpendicular to the axial direction of the nozzle 120, vertical directions of FIG. 9, FIG. 11 and FIG. 12 may be referred to as "X direction" (first direction). A direction from a right front side to a left back side of FIG. 9, a vertical direction of FIG. 10, and a horizontal direction of FIG. 12 may be referred to as "Y direction" (second direction). The X direction and the Y direction are perpendicular to each other. With regard to the X direction, upper sides of FIG. 9, FIG. 11 and FIG. 12 may be called "one side", and lower sides thereof may be called "the other side".

The nozzle 120 is formed similarly to the nozzle 20 with slight differences, except differences of a leading end portion 130 of a leading end-side member 126 from the leading end portion 30 of the leading end-side member 26. Accordingly, like portions of the nozzle 120 other than the leading end portion 130 of the leading end-side member 126 are expressed by like reference signs to those of the nozzle 20, and their detailed description is omitted. As shown in FIGS. 9 to 12, the leading end portion 130 of the nozzle 120 includes a pair of side wall portions 131a and 131b, a connecting wall portion 134 provided to connect the pair of side wall portions 131a and 131b with each other, and a discharge hole 140 formed in the connecting wall portion 134. This leading end portion 130 has a leading end face formed in a combined shape of two linear portions that are linearly protruded to a leading end side of the nozzle 120 with gradually increasing the degree of protrusion from the respective sides to the center of the leading end face when being viewed in the X direction, with an arc portion that is provided between respective ends of the two linear portions and that is extended in an arc shape (R shape).

The pair of side wall portions 131a and 131b have a pair of opposed side wall portions 132a and 132b and a pair of leading end side wall portions 133a and 133b. The pair of opposed side wall portions 132a and 132b are formed to be respectively extended along the axial direction of the nozzle 120 and the X direction and to be opposed to each other across an interval. The pair of leading end side wall portions 133a and 133b are formed to be extended from respective nozzle leading end-side ends of the opposed side wall portions 132a and 132b and become closer to each other toward the leading end side of the nozzle 120 and to be also extended along the X direction.

The connecting wall portion 134 is in cooperation with the pair of side wall portions 131a and 131b (the pair of opposed side wall portions 132a and 132b and the pair of leading end side wall portions 133a and 133b) to form a first recess 137 that is open on one side in the X direction (the upper side in FIG. 11) and the leading end side and to form a second recess 138 that is open on the other side in the X direction (the lower side in FIG. 11) and the leading end side.

A first surface 135 of the connecting wall portion 134 on one side in the X direction (i.e., the first recess 137-side) is formed to be inclined to one side in the X direction along a direction from the leading end side to the base end side of the nozzle 120. A second surface 136 of the connecting wall portion 134 on the other side in the X direction (i.e., the second recess 138-side) is formed to be inclined to the other side in the X direction along the direction from the leading end side to the base end side of the nozzle 120. Accordingly, the first recess 137 and the second recess 138 respectively have depths in the X direction that become shallower along the direction from the leading end side to the base end side of the nozzle 120.

The discharge hole 140 is formed to pass through the connecting wall portion 134 in the axial direction of the nozzle 120 and has an opening 141 that is formed on the first recess 137-side of the connecting wall portion 134. Accordingly, the discharge hole 140 is arranged to connect inside of the nozzle 120 with outside of the nozzle 120 (including the first recess 137). This opening 141 is configured such that at least part of the opening 141 is protruded to the leading end side of the nozzle 120 more than the pair of side wall portions 131a and 131b (the leading end side wall portions 133a and 133b). The opening 141 is formed in an approximately circular shape when being viewed in the axial direction of the nozzle 120 (as shown in FIG. 12).

In the nozzle 120 of this modification, the leading end portion 130 has the pair of opposed side wall portions 132a and 132b and the pair of leading end side wall portions 133a and 133b. Compared with a configuration without the pair of leading end side wall portions 133a and 133b, this configuration shortens the opening area (length in the Y direction) of the first recess 137 on the leading end side of the nozzle 120. This configuration is suitable for a sealing object of a narrow width.

Figure 13:
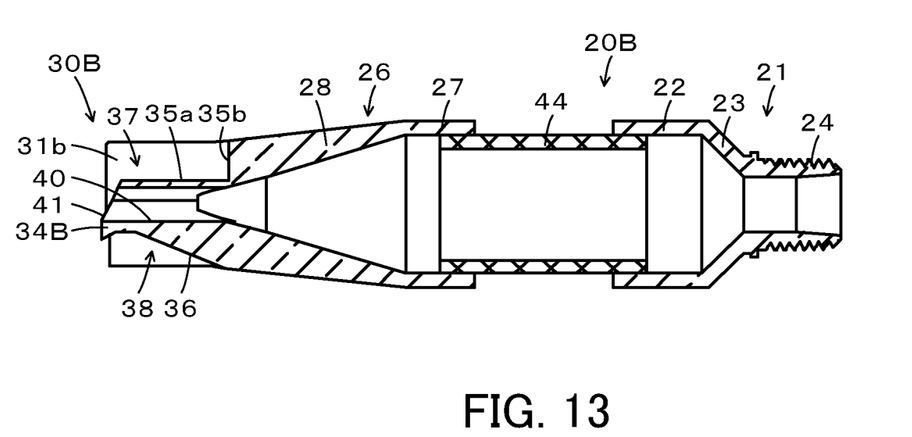
FIG. 13 is a sectional view illustrating a nozzle according to another modification.

In the nozzle 20 of the embodiment or the nozzle 120 of the modification, the first surface 35 or 135 of the connecting wall portion 34 or 134 of the leading end portion 30 or 130 on one side in the X direction (the first recess 37-side or the first recess 137-side) is formed to be inclined to one side in the X direction along the direction from the leading end side to the base end side of the nozzle 20 or 120. This configuration is, however, not essential. For example, like a nozzle 20B shown in FIG. 13, a connecting wall portion 34B of a leading end portion 30B may have a plane 35a that is extended in an axial direction of the nozzle 20B and a plane 35b that is extended in the X direction from one end of the plane 35a (nozzle base end-side end), on one side in the X direction.

In the nozzle 20 of the embodiment or the nozzle 120 of the modification, the pair of side wall portions 31a and 31b or the pair of side wall portions 131a and 131b and the connecting wall portion 34 or 134 of the leading end portion 30 or 130 form the second recess 38 or 138. One modification may not form the second recess 38 or 138.

In the nozzle 20 of the embodiment or the nozzle 120 of the modification, the opening 41 or 141 of the discharge hole 40 or 140 of the leading end portion 30 or 130 is configured such that at least part of the opening 41 or 141 is protruded to the leading end side of the nozzle 20 or 120 more than the pair of side wall portions 31a and 31b or the pair of side wall portions 131a and 131b. According to a modification, the opening 41 or 141 of the discharge hole 40 or 140 may be configured such that no part of the opening 41 or 141 is protruded to the leading end side of the nozzle 20 or 120 more than the pair of side wall portions 31a and 31b or the pair of side wall portions 131a and 131b.

In the nozzle 20 of the embodiment or the nozzle 120 of the modification, the base end-side member 21 and the leading end-side member 26 or 126 are connected with each other by the linkage member 44 having the higher flexibility than the base end-side member 21 and the leading end-side member 26 or 126. One modification may exclude the linkage member 44 and may integrally form the base end-side member 21 with the leading end-side member 26 or 126.

In the nozzle 20 of the embodiment or the nozzle 120 of the modification, the large diameter tubular portions 22 and 27 and the linkage member 44 of the nozzle 20 or 120 are formed to have the sufficiently larger inner diameters than the inner diameter of the small diameter tubular portion 24. According to a modification, the large diameter tubular portions 22 and 27 and the linkage member 44 may be formed to have inner diameters approximately equal to the inner diameter of the small diameter tubular portion 24.

In the nozzle 20 of the embodiment or the nozzle 120 of the modification, the leading end-side member 26 or 126 has the tapered tubular portion 28. One modification may exclude the tapered tubular portion 28.

The present disclosure is applied to the aspect of the sealant discharge system 10 according to the embodiment. The present disclosure is also applicable to the aspect of the sealant discharge apparatus 11 or to the aspect of the nozzle 20.

According to the embodiment, the sealant discharge apparatus 11 is moved by the moving device 50. According to a modification, the sealant discharge apparatus 11 may be moved manually (for example, by the user□s hands). According to the embodiment, the piston 16 of the sealant discharge apparatus 11 is moved and controlled by the controller 52. According to a modification, the piston 16 may be moved manually (for example, by the user□s operation of a lever).

The embodiment describes the aspect of the nozzle 20 used for the sealant discharge apparatus 11 that includes the cartridge with plunger 13 (the cartridge 14 and the plunger 15) and the piston 16. The present disclosure is, however, not limited to this aspect of the nozzle. For example, the present disclosure may be applied to an aspect of a nozzle used for a sealant discharge apparatus provided with a Mono pump having a rotor and a stator or may be applied to an aspect of a nozzle used for a compressed air-type sealant discharge apparatus.

The following describes a correspondence relationship between the primary components of the embodiment described above and the primary components in the respective aspects of the present disclosure described in Summary. The leading end portion 30, the pair of side wall portions 31a and 31b, the connecting wall portion 34 and the discharge hole 40 according to the embodiment respectively correspond to the "leading end portion", the "pair of side wall portions", the "connecting wall portion", and the "discharge hole". The leading end portion 130, the pair of side wall portions 131a and 131b, the connecting wall portion 134 and the discharge hole 140 according to the modification also respectively correspond to the "leading end portion", the "pair of side wall portions", the "connecting wall portion", and the "discharge hole".

The correspondence relationship between the primary components of the embodiment and the primary components in the respective aspects of the present disclosure described in Summary is not at all intended to limit the components of the present disclosure described in Summary, since the embodiment described above is only illustrative for the purpose of concretely describing the aspects of the present disclosure described in Summary. In other words, the present disclosure described in Summary should be interpreted on the basis of the description in Summary, and the embodiment is only one concrete example of the present disclosure described in Summary.

Some aspects of the present disclosure are described above with reference to the embodiment. The present disclosure is, however, not at all limited to the description of the above embodiment but may be implemented in any of various other aspects without departing from the technical scope of the present disclosure.

INDUSTRIAL APPLICABILITY

The aspects of the present disclosure are applicable to, for example, the manufacturing industries of the sealant discharge nozzle and the sealant discharge apparatus.

What is claimed is:

1. A sealant discharge nozzle configured such that a sealant from a cartridge is discharged from a discharge hole of the sealant discharge nozzle, the sealant discharge nozzle having a leading end portion that comprises:
   a pair of side wall portions; and
   a connecting wall portion configured to connect the pair of side wall portions with each other and provided in cooperation with the pair of side wall portions to form a first recess that is open on one side in a first direction perpendicular to an axial direction of the sealant discharge nozzle, and the first recess is open on a leading end side in a second direction parallel to an axial direction of the sealant discharge nozzle, wherein
   the discharge hole has an opening formed on a first recess side of the connecting wall portion;
   wherein the leading end portion comprises a leading end face formed to be protruded to the leading end side with gradually increasing a degree of protrusion from respective sides to a center of the leading end face when being viewed in the first direction.

2. The sealant discharge nozzle according to claim 1,
wherein the leading end face is formed to at least partly include a curved portion in a curved shape when being viewed in the first direction.

3. The sealant discharge nozzle according to claim 2,
wherein the curved portion is at least one of an arc portion in an arc shape, an elliptical arc portion in an elliptical arc shape, or a spline curve portion in a spline curved shape.

4. The sealant discharge nozzle according to claim 1,
wherein the connecting wall portion has a first surface on the first recess side formed to be inclined to the one side in the first direction along a direction from the leading end side to a base end side.

5. The sealant discharge nozzle according to claim 1, wherein the connecting wall portion is provided in cooperation with the pair of side wall portions to form a second recess that is open on another side that is different from the one side in the first direction, and on the leading end side.

6. The sealant discharge nozzle according to claim 1,
wherein the opening of the discharge hole is formed to have a length in the first direction that is longer than a length in a second direction perpendicular to the axial direction and the first direction.

7. The sealant discharge nozzle according to claim 1,
wherein the opening of the discharge hole is configured such that at least part of the opening is protruded to the leading end side more than the pair of side wall portions.

8. The sealant discharge nozzle according to claim 1,
the sealant discharge nozzle comprising a leading end-side member on the leading end side and a base end-side member on a base end side that are connected with each other by a deforming portion configured to be deformable.

9. The sealant discharge nozzle according to claim 1,
the sealant discharge nozzle comprising a middle portion in the axial direction that has a larger inner diameter than an inner diameter of a base end portion.

10. A sealant discharge apparatus, comprising:
the sealant discharge nozzle according to claim 1;
a cartridge configured such that the sealant discharge nozzle is mounted to the cartridge;
a plunger configured to seal a sealant in the cartridge and to be movable in an axial direction of the cartridge; and
a piston configured to press the plunger against a leading end side of the cartridge.

* * * * *